(12) United States Patent
Norris et al.

(10) Patent No.: US 6,599,993 B1
(45) Date of Patent: Jul. 29, 2003

(54) LOW GLOSS TEXTURED POWDER COATING

(75) Inventors: William C. Norris, Rochester Hills, MI (US); Josef Rademacher, Beverly Hills, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/686,461

(22) Filed: Oct. 11, 2000

(51) Int. Cl.⁷ .................. C08L 33/14; C08L 63/02; C08L 63/04; C08L 63/06; C08L 67/02
(52) U.S. Cl. .............. 525/438; 525/172; 525/173; 525/176; 525/508
(58) Field of Search ................ 525/438, 172, 525/173, 176, 508

(56) References Cited

U.S. PATENT DOCUMENTS

| | | | | |
|---|---|---|---|---|
| 4,085,159 A | * | 4/1978 | Marsiat | 525/438 |
| 4,242,253 A | | 12/1980 | Yallourakis | 260/40 TN |
| 4,307,153 A | * | 12/1981 | Bernelin et al. | 525/438 |
| 4,387,214 A | | 6/1983 | Passmore et al. | 528/296 |
| 4,507,441 A | * | 3/1985 | Goring | 525/438 |
| 4,698,426 A | * | 10/1987 | Meyer et al. | 525/438 |
| 4,713,428 A | | 12/1987 | Mülhaupt et al. | 525/523 |
| 4,910,287 A | * | 3/1990 | McLafferty et al. | 525/437 |
| 5,212,263 A | | 5/1993 | Schreffler | 525/533 |
| 5,439,988 A | | 8/1995 | Moens et al. | 525/437 |
| 5,536,785 A | | 7/1996 | Foukes et al. | 525/176 |
| 5,554,681 A | | 9/1996 | Patel | 524/506 |
| 5,780,556 A | | 7/1998 | Yezrielev et al. | 525/437 |
| 5,880,223 A | * | 3/1999 | Shah et al. | 525/438 |

FOREIGN PATENT DOCUMENTS

EP    467 559    3/1991

* cited by examiner

*Primary Examiner*—Robert E. L. Sellers
(74) *Attorney, Agent, or Firm*—Anna M. Budde

(57) ABSTRACT

A powder coating composition that includes at least about 9% by weight, based on total vehicle weight, of a branched carboxylic acid-functional polyester having a number average molecular weight of from about 425 to about 1050 and at least one vehicle component reactive with carboxylic acid groups comprising an epoxy-functional material, produces a matte, textured coating.

16 Claims, No Drawings

LOW GLOSS TEXTURED POWDER COATING

FIELD OF THE INVENTION

The present invention relates to powder coating compositions that provide a low gloss, textured coating.

BACKGROUND OF THE INVENTION

Powder coating compositions have become increasingly important because they give off very little or no volatile material to the environment when cured. Typically, any such emissions are limited to by-products of the curing reaction, such as blocking agents or volatile condensation products.

Powder coatings have found use as both decorative coatings and protective coatings. In particular, powder coatings have been used to provide textured or matte surface coatings for various articles. Matte finishes have been obtained by adding a matting agent that may be a reactive component or may be inert. In the first instance, a matte finish can be obtained by including reactant or reactants that introduce incompatibility, such as a bicyclic amidine or reactants having a different rate of reaction. Alternatively, an inert powder, such as chalk or feldspar, can be added. These methods, however, have produced inconsistent results. Separation of the coating has been a problem. Problems have also be encountered in recycling the powder overspray. In addition, each method requires additional expense from incorporation of another material.

Textured finishes are similarly obtained by adding a texturing agent, for example pulverized poly(vinylidene fluoride) (PVDF) or an inorganic material such as coarse aluminum oxide. Schreffler, U.S. Pat. No. 5,212,263, incorporated herein by reference, discloses obtaining a grainy textured finish by combining a bisphenol A-type epoxy resin, methylene disalicylic acid, and an imidazole bisphenol A epoxy resin. Patel, U.S. Pat. No. 5,554,681, incorporated herein by reference, discloses a textured coating obtained from a powder coating composition including a solid silicone resin and an acrylic flow modifier that is a combination of an acrylic resin and a silica. The silicone resin and the acrylic flow modifier can be used in a powder coating based on a carboxyl-functional polyester resin and a solid bisphenol A epoxy resin.

Each of the methods of the prior art for obtaining matte or textured coatings requires addition of components that are relatively expensive compared to the resins used in the powder coating. Thus, two expensive additives must be included to obtain a textured, matte finish.

In addition to considerations of appearance, powder coating compositions must produce coatings that have integrity and durability. In some applications, such as for appliance coatings, the coating should have good stain resistance. Branched polyester resins have been marketed to the powder coatings industry as additive resins that may be included in powder coatings in amounts of one to three percent by weight, based on the weight of the total vehicle ["total vehicle" meaning all of the resinous or polymeric reactive components], to provide improved stain resistance. No effect on appearance was observed for these amounts.

SUMMARY OF THE INVENTION

The present invention provides a powder coating composition that includes at least about 9% by weight, based on total vehicle weight, of a branched, low molecular weight, carboxylic acid-functional polyester and at least one vehicle component reactive with carboxylic acid groups, preferably an epoxide-functional material. A process for obtaining a matte, textured coating includes steps of applying the powder coating composition of the invention to a substrate and curing the applied coating composition. As used herein, "matte" or "low gloss" refers to a coating having a gloss of 10% or less, preferably 5% or less, as measured at a 60° angle according to ASTM D523. As used herein, "textured" means a granular appearance.

DETAILED DESCRIPTION OF THE INVENTION

The powder coating composition that produces the low gloss, textured coating includes at least an epoxide-functional material and at least about 9% by weight, based on the total vehicle weight, of a branched, low molecular weight polyester.

The polyester resin of the invention has an average of at least about 2.2 carboxylic acid groups and may have an average of up to about 6 carboxylic acid groups. In a preferred embodiment, the polyester resin has a number average molecular weight of from about 425 to about 1050.

Such polyester resins may be obtained by the condensation reaction between a polyol component and a poly-functional carboxylic acid component, in which at least one polyol compound of the polyol component has three or more hydroxyl groups and/or at least one carboxylic acid compound of the poly-functional carboxylic acid component has three or more carboxylic acid groups. The poly-functional carboxylic acid component may also have carboxylic acid anhydrides of carboxylic acid groups. The equivalents of the carboxylic acid and/or anhydride of carboxylic acid are in excess so that an acid-functional polyester is formed.

The polyol component used to make the branched, low molecular weight polyester has an average functionality of at least two, and preferably more than two. The average functionalities of the polyol component and the carboxylic acid component are selected to provide a polyester resin that has at least about 2.2 carboxylic acid groups, on average, per molecule and up to about 6 carboxylic acid groups, on average, per molecule. The polyol component may contain mono-functional, di-functional, tri-functional, and higher functional alcohols. Mixtures of diols and triols are preferred as the polyol component. Examples of useful polyols include, without limitation, ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-1,3-pentanediol, 1,6-hexanediol, 1,4-cyclohexane dimethanol, hydrogenated bisphenol A, and hydroxyalkylated bisphenols. The carboxylic acid component may likewise include mono-functional, di-functional, tri-functional, and higher functional carboxylic acid compounds or anhydrides thereof. Suitable examples include, without limitation, phthalic acid, isophthalic acid, terephthalic acid, hexahydrophthalic acid, pyromellitic acid, succinic acid, azeleic acid, adipic acid, 1,4-cyclohexanedicarboxylic acid, citric acid, trimellitic acid, and anhydrides thereof.

Methods for making polyester resins are well-known. Typically, the polyester is formed by heating together the polyol and carboxylic acid components, with or without catalysis, while removing the by-product of water to drive the reaction toward completion. A small amount of a solvent, such as toluene or xylene, may be added to aid in removing the water through distillation. If added, such solvent is preferably removed form the polyester product before the powder coating formulation is begun. The amounts of polyol materials and carboxylic acid materials are selected and apportioned to produce a polyester having a number average molecular weight of from about 425 to about 1050. The polyester equivalent weight is preferably from about 150 to about 300, preferably from about 150 to about 250, and particularly preferably from about 175 to about 215. The average functionality of the polyester resin (i.e., the average number of carboxylic acid groups per macromolecule of the acid-functional polyester) is at least about 2.2, preferably at least about 2.5, preferably at least about 3, and may be up to about 6, preferably up to about 4. In one preferred embodiment the average functionality of the polyester resin is from about 3 to about 4. The polyester resin should be a solid at room temperature. Preferably, the polyester resin should have a glass transition temperature of at least about 50 to 55° C. to prevent sintering of the powder coating composition. Suitable branched, low molecular weight polyester resins are commercially available. One preferred product is XP 5600, available from Ruco Polymer Corporation, Hicksville, N.Y., 11802.

The powder coating composition further includes at least one vehicle component reactive with carboxylic acid groups, preferably an epoxide-functional material. Examples of epoxide-functional resins include, without limitation, epoxide-functional epoxy resins, epoxide-functional acrylic resins, glycidyl ethers of polyhydroxy materials, glycidyl ester of polycarboxylic acid materials, and triglycidyl isocyanurate. Aliphatic epoxide-functional resins are preferred when color or colorfastness are important properties, for example in white or light-colored coatings or for coatings that will be exposed to sunlight during use.

Specific examples of epoxide-functional epoxy resins include, without limitation, bisphenol A-type epoxy resins, hydrogenated bisphenol A-type epoxy resins, bisphenol F-type epoxy resins, hydrogenated bisphenol F-type epoxy resins, novolac epoxy resins, and alicyclic epoxy resins. In a preferred embodiment, a bisphenol A-type epoxy resin is used. The epoxide-functional epoxy resins preferably have epoxide equivalent weights from about 500 to about 2000, more preferably from about 600 to about 1000. Solid epoxy resins suitable for powder coatings are available commercially, for example from Dow Chemical Company, Midland Mich. under the trademark D.E.R.; from Vantico, Inc. Brewster, N.Y. under the trademark ARALDITE; and from Vianova Resins, Portsmouth, Va.

The epoxide-functional material may also be selected from glycidyl ethers of polyhydroxy materials and glycidyl esters of polycarboxylic acid materials, including polymeric materials having pendant glycidyl ether or glycidyl ester groups. In a preferred embodiment, epoxide-functional acrylic resins are included as the epoxide-functional material. Epoxide-functional acrylic resins may be prepared, for example, by copolymerization of at least one epoxide-functional, ethylenically unsaturated monomer. Examples of epoxide-functional, ethylenically unsaturated monomers include, without limitation, glycidyl acrylate, glycidyl methacrylate, and allyl glycidyl ether. In another method, glycidyl ethers or esters of acrylic copolymers can be formed after the polymerization reaction by reaction of hydroxyl or carboxylic acid groups of the polymer with an epihaloalkane. Hydroxyl-functional acrylic copolymers may be formed by polymerization using hydroxyethyl acrylate, hydroxybutyl acrylate, hydroxybutyl methacrylate, or hydroxypropyl acrylate; carboxyl-functional acrylic copolymers by reaction with α,β-ethylenically unsaturated monocarboxylic acids containing 3 to 5 carbon atoms and other vinylic acids, such as acrylic acid, methacrylic acid, crotonic acid, itaconic acid, maleic acid, fumaric acid or hydrolysis of anhydride-functional acrylic copolymers prepared by reaction with maleic anhydride or itaconic anhydride. Suitable epihaloalkanes include, without limitation, 1-chloro-2,3-epoxypropane (epichlorohydrin), 1-chloro-2-methyl-2,3-epoxypropane and 1-chloro-2,3-epoxybutane. Epichlorohydrin is readily available and extensively used in industry. The reaction with epichlorohydrin or another epihaloalkane is typically carried out under alkaline reaction conditions.

The glycidyl-functional monomer or the hydroxy or carboxylic acid monomer to be epoxidized may be polymerized with one or more comonomers. A wide variety of comonomers may be used. The monomers are selected and apportioned so that the acrylic copolymer is a solid at room temperature and does not sinter. Example of other ethylenically unsaturated monomers that may be used in forming the acrylic copolymer include, without limitation, esters, nitriles, and amides of α,β-ethylenically unsaturated monocarboxylic acids containing 3 to 5 carbon atoms and vinyl esters, vinyl ethers, vinyl ketones, vinyl amides, and vinyl compounds of aromatics and heterocycles. Representative examples include, without limitation, acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; esters of fumaric, maleic, and itaconic acids, like maleic aid dimethyl ester and maleic acid monohexyl ester; vinyl acetate, vinyl propionate, vinyl ethyl ether, and vinyl ethyl ketone; styrene, .alpha.-methyl styrene, vinyl toluene, and 2-vinyl pyrrolidone.

The acrylic copolymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process. Where the reaction is carried out in a solution polymerization process, the solvent should preferably be removed after the polymerization is completed. Preferably, the polymerization is carried out in the absence of any solvent.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a solid acrylic copolymer.

The epoxide-functional acrylic copolymer should have a weight average molecular weight of from 10,000 to 40,000.

Preferably, the weight average molecular weight of the acrylic copolymer is from 10,000 to 25,000. An acrylic copolymer having a weight average molecular weight of from 10,000 to 20,000 is preferred. In yet another preferred embodiment of the invention, the acrylic copolymer has a weight average molecular weight of from 15,000 to 20,000. The acrylic copolymer also has an epoxide equivalent weight is from 600 to 1000, ore preferably from 600 to 900, and most preferably from 700 to 800.

Other examples of vehicle components reactive with carboxylic acid groups include glycoluril resins, PRIMID XL552, available from EMS Primid, Sumter, S.C.

The powder coating composition may also include other resin or polymeric components. In particular, the powder coating composition may also include a carboxylic acid-functional polyester resin with a functionality of two, i.e., a linear polyester. In one embodiment of the invention, a linear polyester may replace up to 20% of the equivalents of branched polyester.

The polyester resin and/or resins and the epoxy resin are apportioned in the coating so that the equivalents of polyester to the equivalents of epoxy resin are preferably in a ratio of from about 0.8 to about 1.2:1, and more preferably in a ratio of from about 0.85 to about 1.15:1, still more preferably in a ratio of from about 0.9 to about 1.1:1, and yet more preferably in a ratio of about 1:1.

The branched polyester resin is utilized in an amount of at least about 9% by weight, preferably at least about 15% by weight, and more preferably at least about and 20% by weight, based on total vehicle weight. The polyester resin may be preferably used in amounts of up to about 30% by weight, more preferably up to about 25% by weight, based on the total vehicle weight. The vehicle component reactive with the polyester, e.g., the epoxide-functional resin, may preferably be utilized in an amount of at least about 70% by weight, preferably at least about 75% by weight, and more preferably at least about and 80% by weight, based on the total weight of the vehicle. The vehicle component reactive with the polyester, e.g., the epoxide-functional resin, may be used in amounts of up to about 90% by weight, preferably up to about 85% by weight, based on the total weight of the vehicle.

It may be desirable to incorporate into the powder coating composition other materials, such as fillers, pigments, leveling agents to help coalesce the film, plasticizers, air release agents such as benzoin, flow agents such as poly(butyl acrylates) and poly(2-ethylhexyl acrylates), hindered amine light stabilizers and ultraviolet light absorbers, antioxidants, and/or catalysts. Moreover, a texturing agent may also be included, for example to more finely adjust the degree of texture.

Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Hindered amine light stabilizers, ultraviolet light absorbers, and anti-oxidants may be added in ways and amounts known to the art to augment the durability of the finished coating, and are particularly useful when the finished coating may be subjected to outdoor exposure.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from 80° C. to 130° C.

The extrudate is then cooled and pulverized. The extrudate may be crushed to a fine flake or granule and then ground by typical methods employed in the art, and classified by sieving or other means. The maximum particle size and the particle size distribution are controlled in the classifying step and affect the smoothness of the final film. Requirements for these parameters depend upon the particular use and application method.

The thermosetting powder coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, cured or uncured before the application of the powder coating compositions.

Application can be by electrostatic spraying or by use of a fluidized bed. Electrostatic spraying is the preferred method. The coating powder can be applied in one or more passes to provide a film thickness after cure of from 25 to 400 microns. The substrate can optionally be preheated prior to application of a powder coating composition to promote uniform and thicker powder deposition.

After application of the coating composition to the substrate, the coating is cured, preferably by heating at a temperature and for a length of time sufficient to cause the reactants to form an insoluble polymeric network. The cure temperature is usually from 160° C. to 205° C., and the length of cure is usually 15 minutes to 60 minutes. Preferably, the coating is cured at 170° C. to 180° C. for 20 to 30 minutes.

Upon curing, the coating composition of the invention produces a low gloss, textured coating. By "low gloss" it is meant that the gloss of the coating at a 60° angle, as measured by ASTM D523, is no more than about 10%, and preferably is 5% or less. The coating compositions of the invention produce the low gloss, textured finishes without the need to add separate matting agents or texturing agents.

In the case of multi-layer coatings, the coating of the invention preferably forms the outer coating layer. The coated substrates with low gloss, textured coatings may be useful for a variety of articles, including appliances, satellite dishes, brown goods (e.g., stereo cases), computer cases, office furniture and office machines such as copy machines, typewriters, printers, filing cabinets, desks, and bookcases;

staplers, hole punchers, non-slip (non-skid) exterior surfaces that may benefit from the textured finish; architectural elements; and automotive vehicle components.

The invention is further described in the following examples. The examples are merely illustrative and do not in any way limit the scope of the invention as described and claimed. All parts are by weight unless otherwise indicated.

Example 1

Preparation of Coating Composition

A powder coating composition was prepared by dry blending 12.33 parts by weight RUCO XP-5600 (a carboxylic acid-functional, branched polyester having an equivalent weight of about 175, available from Ruco Polymer Corporation, Hicksville, N.Y., 11802), 46.37 parts by weight CIBA GT-7013 (a solid bisphenol A epoxy resin from CIBA Resins), 0.80 parts of weight Resiflow P-67 flow control agent (obtained from Estron Chemical), 0.50 parts by weight benzoin, and 40.00 parts by weight titanium dioxide in a planetary mixer, and then melt blending the combination in a twin-screw extruder at a temperature of 110° C. The extrudate was cooled and pulverized to produce a powder coating having an average particle size of 45 microns.

The powder coating was applied to a steel substrate using an electrostatic spray gun. The applied coating was cured in a convection oven at 350° F. for 20 minutes.

The cured coating had a gloss of less than 5% at a 60° angle, as measured according to ASTM D523. The coating was observed to have medium granular texture. Stain resistance to food products (to milk, tea, coffee, eggs, meat fats, mustard, ketchup, etc.) and alkali chemical resistance (oven cleaner) were measured by spotting with the substance and leaving the substance on the surface for an interval of time. Both stain resistance and chemical resistance were excellent. The impact resistance of the coating was adequate.

The invention has been described in detail with reference to preferred embodiments thereof. It should be understood, however, that variations and modifications can be made within the spirit and scope of the invention.

What is claimed is:

1. A powder coating composition comprising
   (a) at least about 9% by weight, based on total vehicle weight, of a branched carboxylic acid-functional polyester having a number average molecular weight of from about 425 to about 1050 and an equivalent weight of from about 150 to about 300; and
   (b) at least one vehicle component reactive with carboxylic acid groups, comprising an epoxide-functional material, wherein the powder coating produces a low gloss, textured cured coating.

2. A powder coating composition according to claim 1, wherein the polyester has, on average, from about 2.2 to about 6 carboxylic acid groups per molecule.

3. A powder coating composition according to claim 1, wherein the polyester has an equivalent weight of from about 150 to about 250.

4. A powder coating composition according to claim 1, wherein the polyester has an equivalent weight of from about 175 to about 215.

5. A powder coating composition according to claim 1, wherein the polyester has, on average, from about 3 to about 4 carboxylic acid groups per molecule.

6. A powder coating composition according to claim 1, wherein the epoxide-functional material comprises a member selected from the group consisting of epoxide-functional epoxy resins, epoxide-functional acrylic resins, glycidyl ethers of polyhydroxy materials, glycidyl ester of polycarboxylic acid materials, and triglycidyl isocyanurate.

7. A powder coating composition according to claim 1, wherein the epoxide-functional material is aliphatic.

8. A powder coating composition according to claim 1, wherein the epoxide-functional material comprises a member selected from the group consisting of bisphenol A epoxy resins, hydrogenated bisphenol A epoxy resins, bisphenol F epoxy resins, hydrogenated bisphenol F epoxy resins, novolac epoxy resins, and alicyclic epoxy resins.

9. A powder coating composition according to claim 1, wherein the epoxide-functional material comprises a bisphenol A epoxy resin.

10. A powder coating composition according to claim 1, wherein the epoxide-functional material has an epoxide equivalent weight from about 500 to about 2000.

11. A powder coating composition according to claim 1, wherein the epoxide-functional material has an epoxide equivalent weight from about 600 to about 1000.

12. A powder coating composition according to claim 1, wherein the epoxide-functional material comprises an epoxide-functional acrylic resin.

13. A powder coating composition according to claim 1, wherein the ratio of equivalents of polyester carboxylic acid to equivalents of the vehicle component reactive with carboxylic acid groups is from about 0.8 to about 1.2:1.

14. A powder coating composition according to claim 1, wherein the ratio of equivalents of polyester carboxylic acid to equivalents of the vehicle component reactive with carboxylic acid groups is from about 0.9 to about 1.1:1.

15. A powder coating composition according to claim 1, comprising at least about 15% by weight, based on total vehicle weight, of the branched carboxylic acid-functional polyester.

16. A powder coating composition according to claim 1, comprising at least about 9% to about 30% by weight, based on total vehicle weight, of the branched carboxylic acid-functional polyester.

* * * * *